United States Patent [19]

Crane et al.

[11] Patent Number: 4,890,318
[45] Date of Patent: Dec. 26, 1989

[54] BUILDING ENTRANCE TERMINAL

[75] Inventors: Robert A. Crane, Windham; Harrod W. Morse, Portland, both of Me.

[73] Assignee: GTE Products Corporation, Stamford, Conn.

[21] Appl. No.: 109,568

[22] Filed: Oct. 19, 1987

[51] Int. Cl.⁴ .............................................. H04M 9/00
[52] U.S. Cl. ..................................... 379/399; 361/356; 174/65 R
[58] Field of Search ................... 220/33, 3.94, 22, 260, 220/263, 3.8, 50; 174/52 R, 65 R, 59, 60; 361/356, 358; 379/440, 399, 442, 441, 445; D13/40

[56] References Cited

U.S. PATENT DOCUMENTS

| 3,534,146 | 10/1968 | Fell | 174/65 R |
| 3,654,663 | 4/1972 | Algotsson | 220/3.8 X |
| 3,742,119 | 6/1973 | Newman | 174/65 R |
| 4,051,322 | 9/1977 | Park et al. | 174/65 R |
| 4,644,095 | 2/1987 | Bright et al. | 174/50 |
| 4,658,422 | 4/1987 | Sparks | 379/442 |

FOREIGN PATENT DOCUMENTS

| 0564946 | 3/1958 | Belgium | 174/65 R |
| 0295392 | 2/1916 | Fed. Rep. of Germany | 174/50 |
| 0552521 | 2/1943 | United Kingdom | 174/65 R |

OTHER PUBLICATIONS

NEMA Type 12 Panel Enclosures, Hoffman, Anoka, Minnesota, Sep. 1962, pp. 1-4.

Primary Examiner—Jin F. Ng
Assistant Examiner—Randall S. Vaas
Attorney, Agent, or Firm—James Theodosopoulos

[57] ABSTRACT

A building entrance telephone terminal enclosure is provided having a bottom wall with a plurality of openings formed therein for entry of cables into the enclosure. The bottom wall is formed of a pair of plates which mate in meshing engagement along a line running through the centerlines of the openings such that a cable and the components to which it is connected may be installed into the enclosure without removing the components from the cable. The enclosure structure comprises a door which is interchangeable from a left opening to a right opening configuration, and a readily removable, and installable, panel for mounting the components in the enclosure.

11 Claims, 5 Drawing Sheets

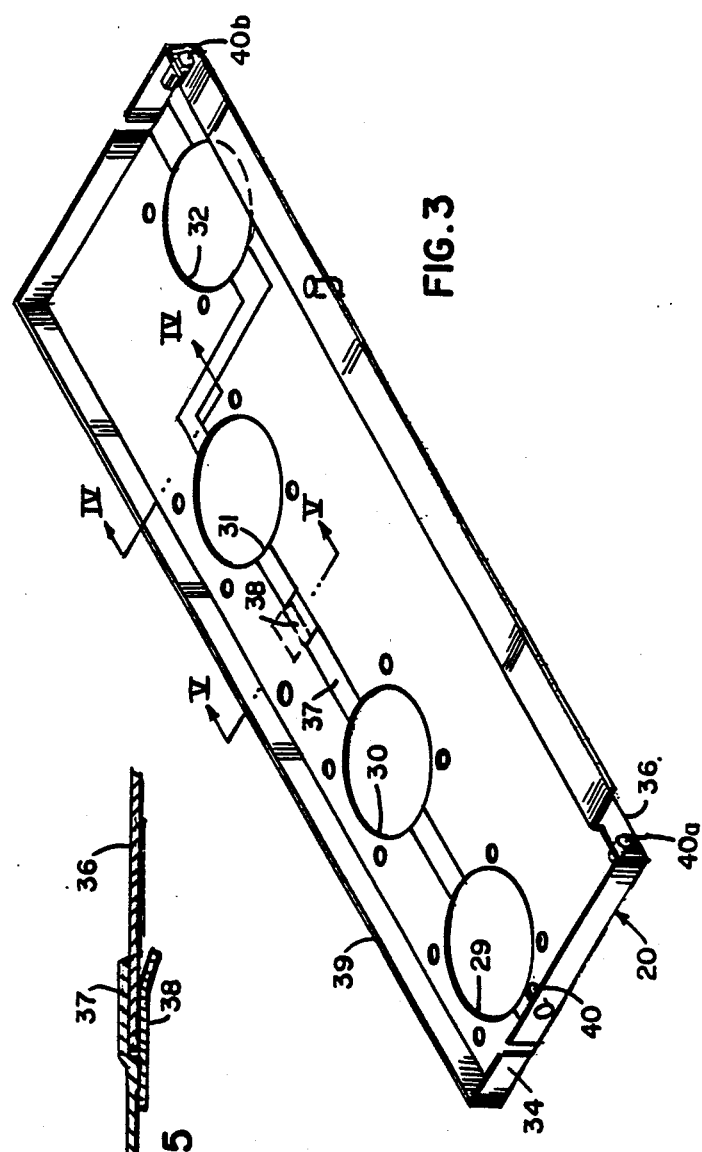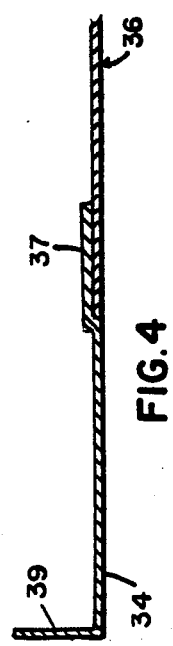

BUILDING ENTRANCE TERMINAL

BACKGROUND OF THE INVENTION

The present invention relates to component enclosures, and more particularly to a terminal enclosure for housing telephone components or the like.

In the telecommunications industry, in order to provide telephone service to a customer, or plurality of customers at a location, a building entrance terminal is generally installed having cable pairs which extend into the enclosure to carry the telephone wiring into the building. The building entrance terminal is generally mounted on a wall either within the building itself, or on an exterior wall where it is susceptible to the environment. Often, it becomes necessary to remove the terminal enclosure which has become damaged through aging or accident, and to replace it with a new enclosure to preserve the integrity of the connections within the enclosure.

In the prior art building entrance terminals, a new enclosure could be installed only by removing the plurality of wires from the connectors within the terminal enclosure, removing the cables from the enclosure, inserting the cables into the new enclosure and reconnecting the plurality of wires within the new enclosure. As one would conclude, this process takes a significant length of time, depending on the total number of cable pairs installed within the building entrance terminal and, during the entire procedure, every telephone line passing through the building entrance terminal is out of service. This presents a severe a problem for high usage telephone lines as well as an inconvenience for the normal telephone user.

It is therefore the object of the present invention to provide a terminal enclosure for telephone components or the like which allows the installer to remove a terminal enclosure and replace it with a new one without a major disruption of telephone service.

Another object of the invention is to provide a terminal enclosure of the type described in which entire cables may be removed and replaced without a major disruption of the telephone service.

Yet another object of the invention is to provide a terminal enclosure of the type described wherein the mounting panel employed to support the terminals for the cable connections is readily removable and interchangeable with other equipment panels.

Still another object of the invention is to provide a terminal enclosure for telephone components which is adaptable for mounting in a plurality of locations and particularly adaptable for both indoor and outdoor use.

SUMMARY OF THE INVENTION

The above objects and other objects which will become apparent as the description proceeds are achieved by providing a terminal enclosure for telephone components or the like comprising wall structure forming the enclosure and having at least one wall with a plurality of openings formed therein providing for entry of cables for connecting components contained in the enclosure. The one wall comprises a pair of wall segments separable one from the other along a parting line which extends through the centerline of the openings and a flange means interconnecting the wall segments. With one of the wall segments removed from the wall structure, cables are laid into those portions of the openings in the other of the wall segments without disconnecting the cables from the attached components and the one wall segment is meshed into engagement with the other wall segment to form the one wall of the enclosure containing the cable openings.

The flange means interconnecting the wall segments generally comprises an inwardly stepped flange on a wall segment extending along the parting line, the flange being inwardly stepped the approximate thickness of the other wall segment and extending substantially parallel to the outer surface of the wall to define a continuous plane over the greater portion of the parting line.

In a more detailed sense, the one wall segment of the terminal enclosure which is removable is attached to the wall structure by threaded fasteners and the other wall segment is fixedly attached to the wall structure, as by welding.

The terminal enclosure may contain a mounting panel disposed in spaced relation with the rear wall and substantially parallel thereto, and a pair of support members for receiving the panel. One the support members has fastener receptacles mounted thereon, and the other of the support members has a hinge with a flange having threaded fasteners disposed therein with heads extending towards the panel. The panel has a pair of fasteners connected to one side thereof for mating engagement with the fastening elements and the opposite side of the panel has a pair of key-hole shaped slots formed therein, the larger opening of the key-hole slot being dimensioned larger than the threaded fastener heads and the smaller opening of the slot being dimensioned less than the threaded fastener heads. The panel is readily removable and attachable to the supports by sliding the key-hole slots under the threaded fastener heads when the mating fasteners are removed from the fastener receptacles.

An enclosure of the type described may also be provided with a front opening having an inturned mounting flange disposed adjacent the opening and parallel to the rear wall. A removable door for covering the opening has a hinged member fixed at one edge thereof and a latching mechanism disposed adjacent its opposite edge. The hinge member has a pair of openings formed adjacent the ends thereof and the pair of spaced openings formed near its center. A bail for receiving the bolt of the latching mechanism is provided having a base with a pair of spaced opening formed thereon corresponding to the spaced openings near the center of the hinge member. Each of the side wall mounting flanges has a pair of openings formed in the top and bottom thereof and a pair of spaced opening formed near the center thereof, all corresponding to the openings formed in the hinge member. The hinge member and the bail are mountable on either of the side walls providing for interchangeability of the door and its bail from one side to the other of the terminal enclosure as is convenient.

A terminal enclosure having a pair of spaced side walls, a top wall, a rear wall, a bottom wall and a front opening may also be provided having side walls and a top wall which comprise an inturned mounting flange disposed adjacent the openings and parallel to the rear wall and a hinged door mounted on one of the side walls inturned mounting flanges. Each of the top and side wall flanges has a forwardly extending lip formed thereon and the top wall terminates in an outwardly extending land for receiving the door in the closed position. The mounting flange, the lip, and the land on the top wall form a U-shaped gutter for drainage between the wall and the door in the closed position.

BRIEF DESCRIPTION OF THE DRAWING

The foregoing and other features of the invention will be more particularly described in connection with the preferred embodiment, and with reference to the accompanying drawing, wherein:

FIG. 3 is a perspective view showing the elements of FIG. 2 assembled to form the bottom portion of the enclosure of FIG. 1;

FIG. 4 is a sectional view taken along the lines IV—IV of FIG. 3 showing details of the structure of FIG. 3;

FIG. 5 is a sectional view taken along the lines V—V of FIG. 3 showing further details of the structure shown in FIG. 3;

DESCRIPTION OF THE PREFERRED EMBODIMENT

Figure 1:
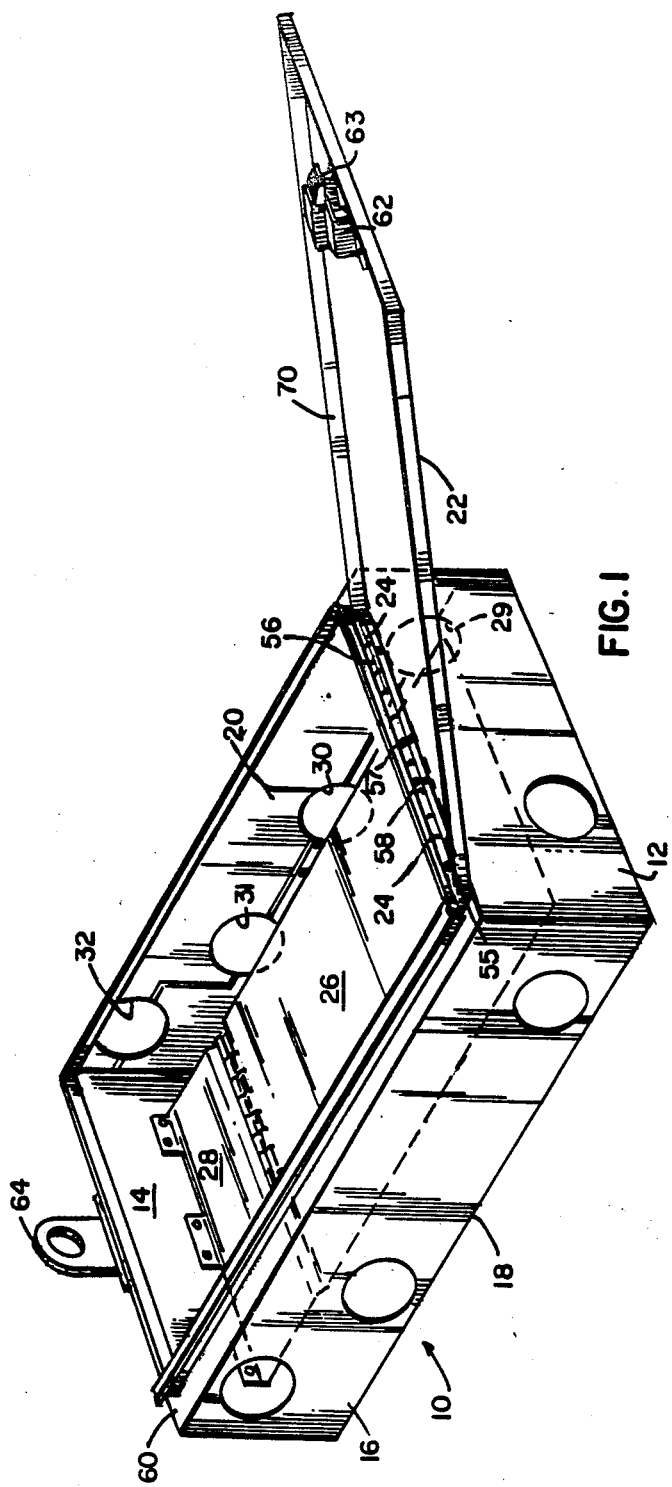
FIG. 1 is an elevational perspective view showing an indoor/outdoor building entrance telephone terminal enclosure constructed in accordance with the teachings of the present invention.
Figure 2:
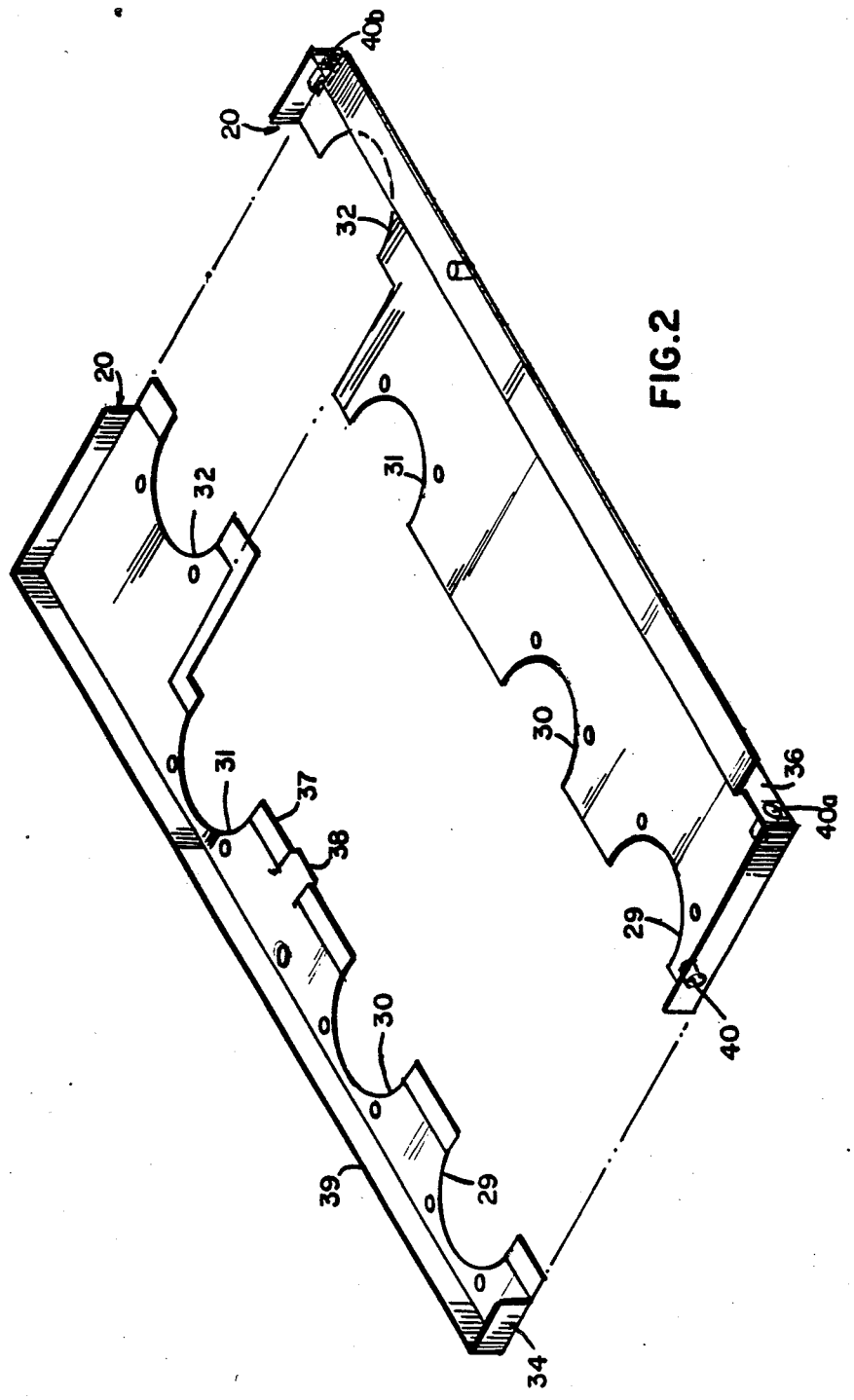
FIG. 2 is an exploded perspective view showing elements forming the bottom portion of the enclosure of FIG. 1.

Referring to the drawing, and in particular to FIGS. 1, 2 and 3, there is shown a terminal enclosure 10 for telephone components or the like comprising wall structure including a pair of spaced side walls 12 and 14, a top wall 16, a rear wall 18 and a bottom wall 20. A door 22 is attached to the wall 12 by a hinge member 24 for closing the front opening of the enclosure 10.

The interior of the enclosure 10 is provided with a mounting panel 26 which is hinged to a fixed panel 28 and a plurality of wire connector terminals (not shown) are mounted on the panel 26 for distribution of the telephone lines entering the enclosure to the various telephone users with a building. The bottom wall 20 has a plurality of circular openings 29, 30, 31 and 32 which are provided for entry of cables (not shown) into the interior of the enclosure 10.

Referring now to FIGS. 2 through 5, the bottom wall 20 is shown to comprise a pair of wall segments 34 and 36 which are joined at a parting line running substantially through the centerlines of the circular openings 29, 30, 31 and 32. As best shown in FIGS. 4 and 5, the wall segment 34 has an inwardly stepped flange 37 which extends along the parting line of the wall segments and is inwardly stepped for a distance substantially equal to the thickness of the wall segment 36. As is evident from FIG. 4, with the wall segments 34 and 36 in meshed engagement, the outer surface of the bottom wall 20 defines a substantially continuous plane over the greater portion of the parting line. Thus, any fittings which are required to assemble a cable into an opening 29, 30, 31 or 32 is provided with a continuous mounting surface, and therefore may be sealed from the environment, without having gaps or openings, by virtue of the intermeshing engagement of the wall segments 34 and 36.

The inwardly stepped flange 37 is continuous and a tab 38 is fixedly attached to the wall segment 34 midway between the ends of the wall segment 34, the tab extending toward and overlapping the wall segment 36 to provide support at the centerline of the wall 20.

The walls segment 34 has a peripheral flange 39 provided for attaching the segment to the side and rear walls of the enclosure 10 and is generally fixed in place by spot welding. The wall segment 36 is provided with threaded bosses 40, 40a, and 40b which mate with drilled holes in the side wall 12 and side wall flanges, and the wall segment 36 is suitably attached by threaded fasteners such that it may be easily disassembled from the enclosure 10.

While the above description has been directed to the bottom wall 20 having wall segments 34 or 36, it should be apparent that either of the side walls 12 or 14 or the top wall 16 could be so constructed if it were desired to apply the inventive concept to these walls.

Figure 6:
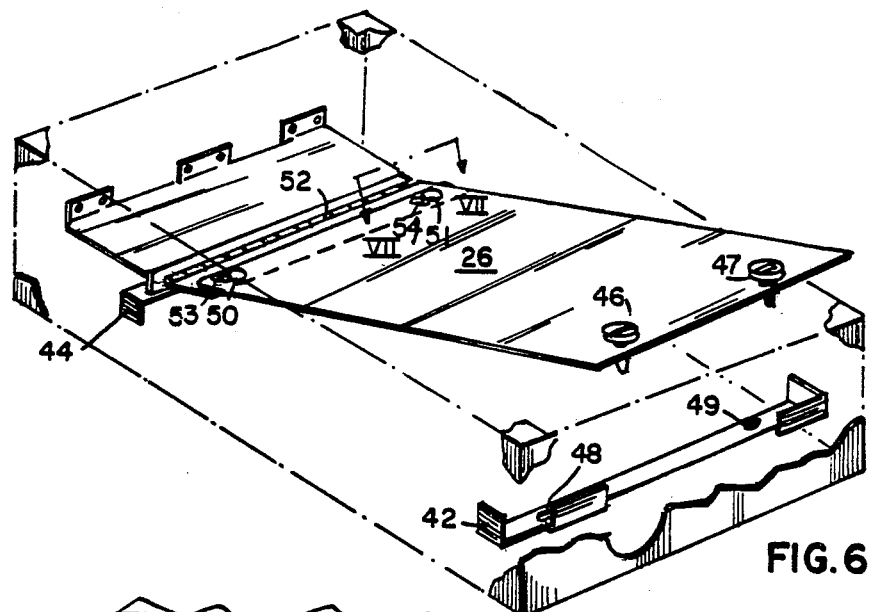
FIG. 6 is an elevational perspective view similar to FIG. 1 showing details of the internal structure of the enclosure shown in FIG. 1.
Figure 7:
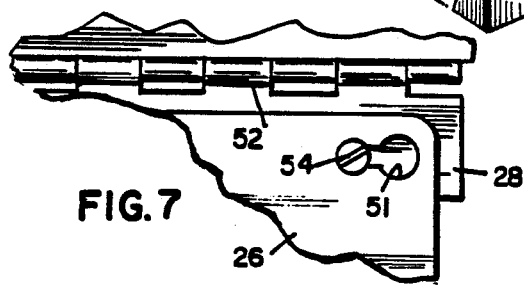
FIG. 7 is a detailed view taken in the area designated VII—VII of FIG. 6 showing a portion of the structure of FIG. 6 taken on an enlarged scale for clarity.

Referring now to FIG. 6, the mounting panel 26 is shown to be supported by a pair of support members 42 and 44, the hinged end of the panel being connected to the member 44 and the movable free end of the panel being supported by the member 42. In order to gain access to the rear of the panel 26, a pair of quarter turn fasteners 46 and 47 are located adjacent the movable end of the panel and matingly engage with receptacles 48 and 49 for mounting the support member 42. At the opposite end of the panel 26, a pair of key-hole shaped slots 50 and 51 are formed adjacent the edge of the panel. A hinge member 52 is attached to the support member 44 and has a pair of headed fasteners 53 and 54 attached to one flange thereof. The slots 50 and 51 are dimensioned such that the larger opening of the keyhole shape is larger than the threaded fastener head and the smaller opening of the slot is dimensioned less than the threaded fastener head such that the panel is readily movable and attachable to the support 44 by turning the fasteners 46 and 47 and sliding the slots 50 and 51 under the threaded fastener heads, as best shown in FIG. 7.

Figure 8:
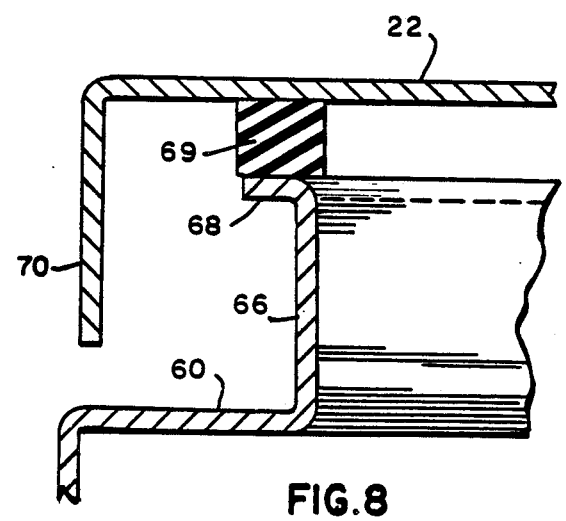
FIG. 8 is a sectional view of the top wall flange of the enclosure of FIG. 1 with the cover in the closed position showing details of the structure taken on an enlarged scale for clarity.
Figure 9:
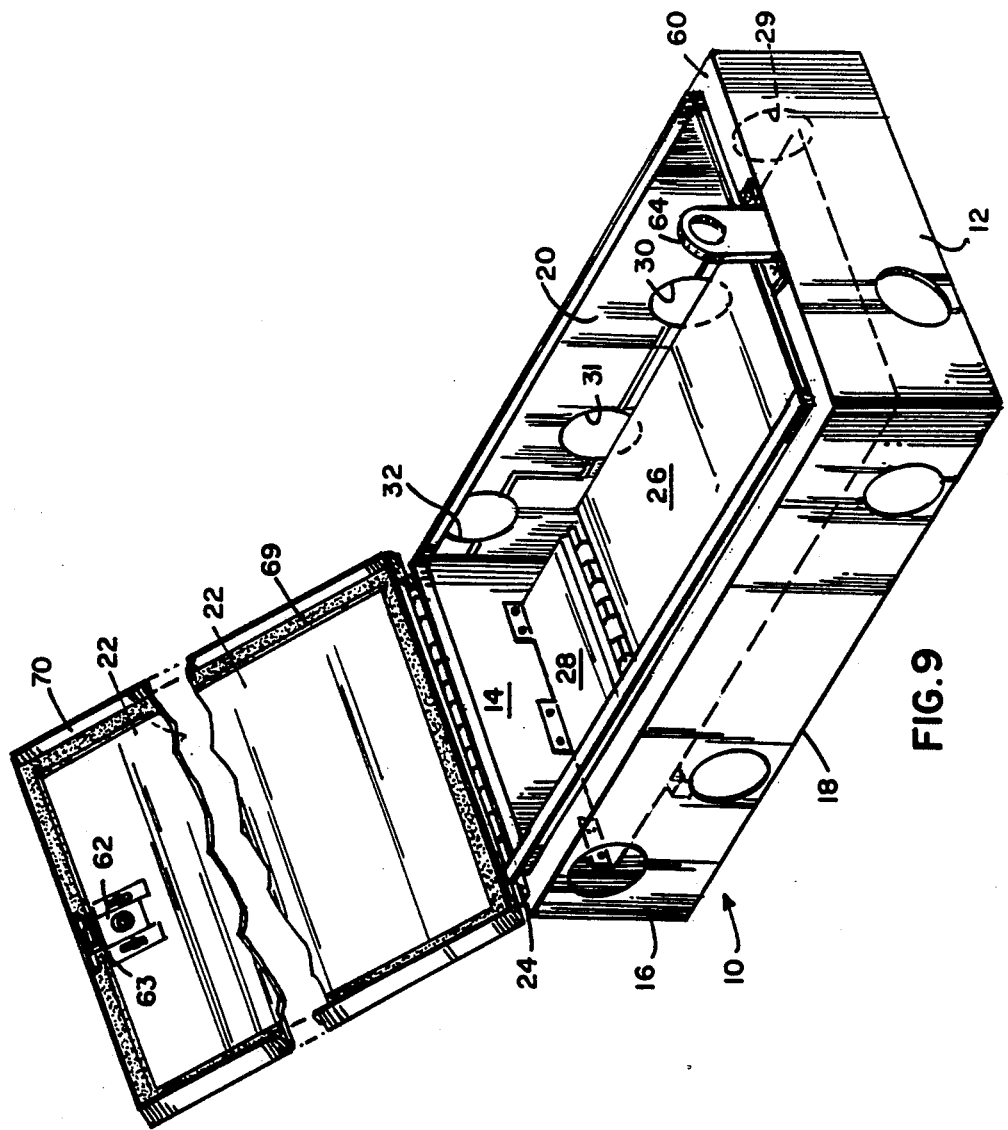
FIG. 9 is an elevational perspective view similar to FIG. 1 showing the enclosure of FIG. 1 with the door mounted on the opposite side of the enclosure.

Referring now to FIGS. 8 and 9, and in particular to FIG. 9, it will be noted that the door 22 is susceptible to mounting either on the side wall 12 a shown in FIG. 1 or on the side wall 14 as shown in FIG. 9. As seen in FIG. 1, the hinge 24 of the door 22 is provided with a pair of openings 55 and 56 formed adjacent the ends of the hinge and a pair of spaced openings 57 and 58 formed near the center of the hinge to accommodate suitable fasteners. An inturned mounting flange 60 extends around the periphery of the opening in the enclosure 10 and the flange extending from each of the side walls 12 and 14 has mating holes spaced according to the openings 55, 56, 57 and 58 in the hinge 24 for mounting the door to either side wall 12 or 14. A latching mechanism 62 having a bolt 63 is provided on the opposite edge of the door 22 from the hinge 24. A bail 64 is provided with a pair of mounting holes corresponding to the openings 57 and 58 in spacing and is therefore mountable on either the portion of flange 60 of the wall 12 or the portion of the flange 60 of the wall 14, when the hinge 24 is assembled onto the opposite wall flange.

Referring now to FIG. 8, the inturned mounting flange 60 is shown to be substantially parallel to the rear wall and terminates in a forwardly extending lip 66 having an outwardly extending land 68 for receiving the door 22 in the closed position. The door 22 is provided with a gasket 69 of closed cell foam or other material and has an edge 70 of the door turned inwardly to aid in sealing the contents of the enclosure 10 from the environment. As an added feature, the mounting flange 60, lip 66 and a land 68 of the top wall 16 form a substantially U-shaped gutter for drainage between the top wall and the door 22 in the closed position.

In the present invention therefore, a terminal enclosure for telephone components or the like has been provided which is very versatile and provides protection to the components within the enclosure. When it is desired to replace an old enclosure with a new enclosure of the present invention, it is merely necessary to cut the material of the old enclosure to allow the cables and component connectors within the enclosure to be removed while still connected to the terminals. The new enclosure is then mounted in a desired location, the wall segment 36 is removed, and cables are placed into the appropriate openings 29, 30, 31 and 32. The structure thus allows replacement of entire cables, without total disruption in service. As the old enclosure is cut and removed while leaving the cables and all connections intact, individual telephone pairs are transferred to the new equipment one at a time, thereby eliminating the mass disruption of service normally associated with equipment upgrading.

Since locations in which the type of enclosure is installed are sometimes very restrictive in respect to space allotment, the present design provides an enclosure in which the door 22 may be installed on either the wall 12 or 14 and the related hardware may be employed.

The readily removable mounting panel 26 provides a structure which allows for interchangeability of panels, as needed, within the enclosure 10 and by hinging the panel, there is greater access to the rear of the panel and enclosure 10 for installation and service. As one enclosure will accept a variety of panels, when a new application for the enclosure is developed, a new panel can be designed for that application, and the new panel is readily mountable within the enclosure 10.

We claim:

1. A terminal enclosure for telephone components or the like comprising:
    a pair of spaced side walls, a top wall, a rear wall and a bottom wall;
    a mounting panel disposed in spaced relation with said rear wall, and substantially parallel thereto,
    a pair of support members for receiving said panel, one of said support members having mounted thereon at least one pair of receptacles for receiving a pair of fastening elements and the other of said support members having mounted thereon a hinge with a flange having a pair of threaded fasteners disposed therein with heads extending toward said panel; and
    said panel having a pair of fasteners connected to one side thereof for mating engagement with said fastener receptacles and the opposite side of said panel having a pair of keyhole shaped slots formed therein, a larger opening of each said slot being dimensioned larger than said threaded fastener heads and a smaller opening of each said slot dimensioned less than said threaded fastener heads whereby said panel is readily attachable to said supports by sliding said smaller openings of said key-hole slots under said threaded fastener heads and releasable by passing the larger openings over said fastener heads to release said panel.

2. A terminal enclosure as set forth in claim 1 wherein said bottom wall has a plurality of openings formed therein providing for entry of cables into said enclosure, said bottom wall comprising a pair of wall segments separable one from the other along a parting line extending through the centerlines of said openings.

3. A terminal enclosure as set forth in claim 2 wherein one of said wall segments is removably attached to said pair of spaced side walls by threaded fasteners and the other of said wall segments is fixedly attached to said spaced side walls and said rear wall.

4. A terminal enclosure as set forth in claim 3 further including an inwardly stepped flange on said other wall segment extending along said parting line, said inwardly stepped flange being inwardly stepped the thickness of said one wall segment and extending substantially parallel thereto whereby the outer surface of said bottom wall defines a continuous plane over the greater portion of said parting line when said one wall segment is attached to said other wall segment.

5. A terminal enclosure for telephone components, comprising:
    a wall structure comprising a pair of spaced side walls, a top wall and a bottom wall, each having an edge thereof forming an opening of said enclosure;
    at least one of said side walls having a plurality of openings formed therein providing for entry into said enclosure of cables connecting components contained in said enclosure;
    said one wall comprising a pair of wall segments separable one from the other along a parting line extending through the centerline of said openings, said one wall segment being removably attached to said wall structure by threaded fasteners and said other wall segment being fixedly attached to said wall structure;
    flange means interconnecting said wall segments whereby with said one wall segment removed from said wall structure, cables are laid into those portions of said openings in the other of said wall segments without disconnecting the cables from the attached components and said one wall segment is meshed into engagement with said other wall segment along said parting line to form said one wall of said enclosure; and
    door means for providing access to the interior of said enclosure disposed on said edges of said wall structure in the closed position.

6. A terminal enclosure as set forth in claim 5 wherein said flange means comprises an inwardly stepped flange on said other wall segment extending along said parting line, said inwardly stepped flange being inwardly stepped the approximate thickness of said one wall segment and extending substantially parallel thereto whereby the outer surface of said one wall defines a continuous plane over the greater portion of said parting line when said one wall segment is meshed into engagement with said other wall segment to form said wall.

7. A terminal enclosure as set forth in claim 6 in which said flange means further comprises a tab disposed on said other wall segment at said parting line midway between the ends of said other wall segment, said tab extending toward, and overlapping, said one wall segment to retain it in engagement with said other wall segment at said parting line.

8. A terminal enclosure as set forth in claim 5 wherein said openings formed in said one wall are circular and provide substantially semi-circular openings in said one wall segment and said other wall segment, each of said substantially semi-circular openings extending to an edge of its respective wall segment adjacent said parting line to provide an opening at said edge which is at least as great as the diameter of said circular opening.

9. A terminal enclosure as set forth in claim 5 wherein said enclosure door means comprises a hinged door and each of said side wall edges comprise an inturned mounting flange disposed adjacent said opening and parallel to said hinged door in the closed positions;

said door having a hinge member affixed at one edge thereof and a latching means disposed adjacent the opposite edge thereof, said hinge member having a pair of openings formed adjacent the ends thereof, and a pair of spaced openings formed near the center thereof, a bail for receiving the bolt of said latching means, said bail having a base with a pair of spaced openings formed thereon corresponding to said pair of spaced openings in the center of said hinge member; and each of said wall mounting flanges having a pair of openings formed in the top and bottom thereof and a pair of spaced openings formed near the center thereof, all corresponding to the openings formed in said hinge member whereby said hinge member and said bail are mountable on either of said side walls.

10. A terminal enclosure as set forth in claim 5 wherein each of said side walls and said top wall has an inturned mounting flange disposed adjacent said enclosure opening and parallel to said door means;

each of said top and side wall flanges having a forwardly extending lip formed thereon and said top wall flanges terminating in an outwardly extending land for receiving said door in the closed position, said mounting flange, said top wall lip and said land on said top wall forming a U-shaped gutter for drainings between said top wall and said door in the closed position.

11. A terminal enclosure as set forth in claim 10 wherein said flange means comprises an inwardly stepped flange on said other wall segment extending along said parting line, said inwardly stepped flange being inwardly stepped the approximate thickness of said one wall segment and extending substantially parallel thereto whereby the outer surface of said one wall defines a continuous plane over the greater portion of said parting line when said one wall segment is meshed into engagement with said other wall segment.

* * * * *